United States Patent
Campagnolo

(10) Patent No.: US 7,381,142 B2
(45) Date of Patent: *Jun. 3, 2008

(54) GEAR SHIFT DEVICE FOR BICYCLES

(75) Inventor: Valentino Campagnolo, Vicenza (IT)

(73) Assignee: Campagnolo S.r.l., Vincenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,718

(22) Filed: May 22, 2006

(65) Prior Publication Data

US 2006/0211528 A1    Sep. 21, 2006

Related U.S. Application Data

(63) Continuation of application No. 10/663,458, filed on Sep. 15, 2003, now Pat. No. 7,048,659, which is a continuation of application No. 09/716,236, filed on Nov. 21, 2000, now Pat. No. 6,623,389.

(30) Foreign Application Priority Data

Nov. 23, 1999    (IT) ................ TO99A1023

(51) Int. Cl.
F16H 9/24    (2006.01)
F16H 59/00    (2006.01)
B62M 9/12    (2006.01)

(52) U.S. Cl. .......................... 474/70; 474/80

(58) Field of Classification Search ............ 474/78–82, 474/49–50, 102–103, 70; 280/236, 238; 340/456, 686.3; 33/1 R; 74/473.14
See application file for complete search history.

(56) References Cited

U.S. PATENT DOCUMENTS 3,787,690 A    1/1974    Neff
4,861,320 A    8/1989    Nagano
4,946,425 A    8/1990    Buhlmann
5,023,422 A    6/1991    Laughton et al.
5,025,563 A    6/1991    Rennerfelt
5,199,929 A    4/1993    Stites
5,359,884 A    11/1994    Fey et al.
5,470,277 A *  11/1995    Romano ................ 474/70
5,480,356 A    1/1996    Campagnolo
5,538,477 A    7/1996    Bellio et al.
5,551,315 A    9/1996    Pikoulas
5,949,344 A    9/1999    Yasuda et al.
6,012,353 A    1/2000    Kawakami
6,047,230 A    4/2000    Spencer et al.
6,142,281 A    11/2000    Campagnolo

FOREIGN PATENT DOCUMENTS

DE    3720828 A1    1/1989
DE    19848052 A1    4/2000
DE    10030038 A1    1/2002
EP    0300183 A1    1/1989
EP    0529664       8/1992
EP    1357023 A1    10/2003
FR    2812612 A1    8/2000
JP    62-164268 A    7/1987
JP    8175471        7/1996

* cited by examiner

*Primary Examiner*—Marcus Charles
(74) *Attorney, Agent, or Firm*—Volpe and Koenig, PC

(57) ABSTRACT

A motorized bicycle gear shift device comprising a derailleur and an electric motor, associated directly with the derailleur, for controlling the derailleur and an electric transducer of absolute type, also associated with the derailleur for producing an electric signal indicative of the absolute position of the movable body of the derailleur.

37 Claims, 9 Drawing Sheets

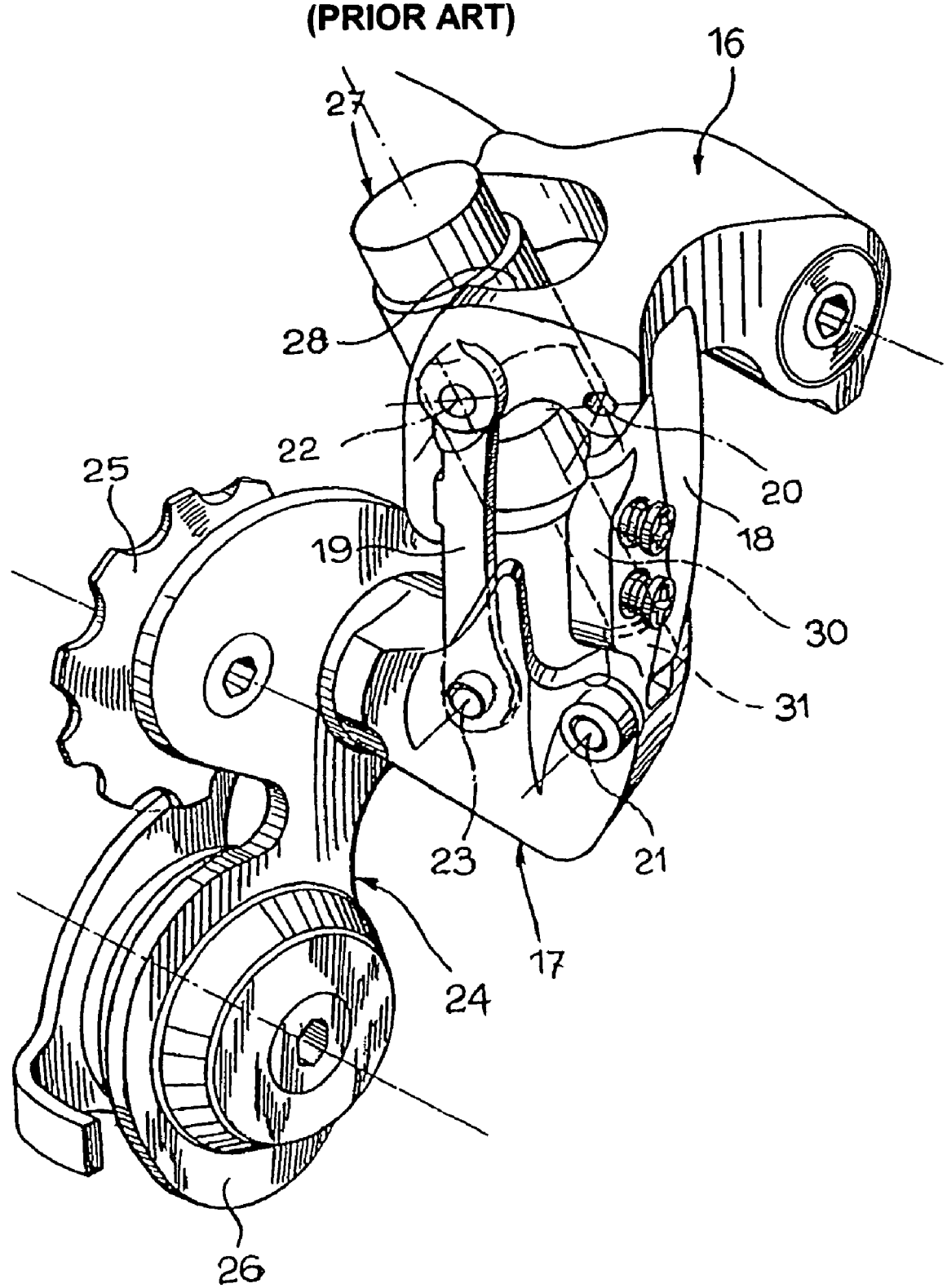

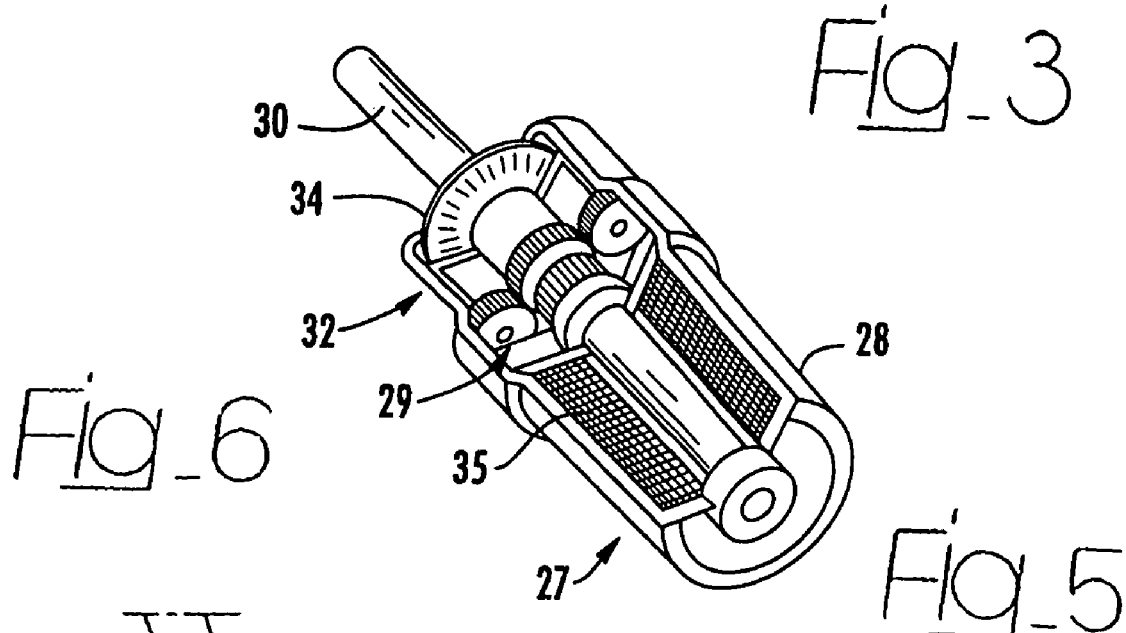
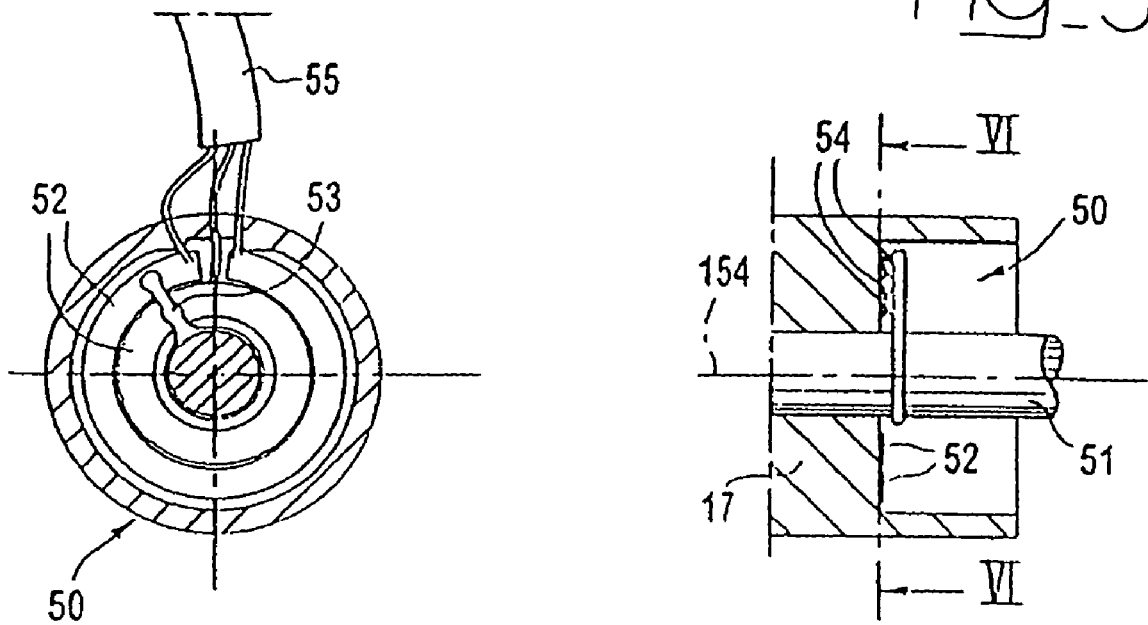
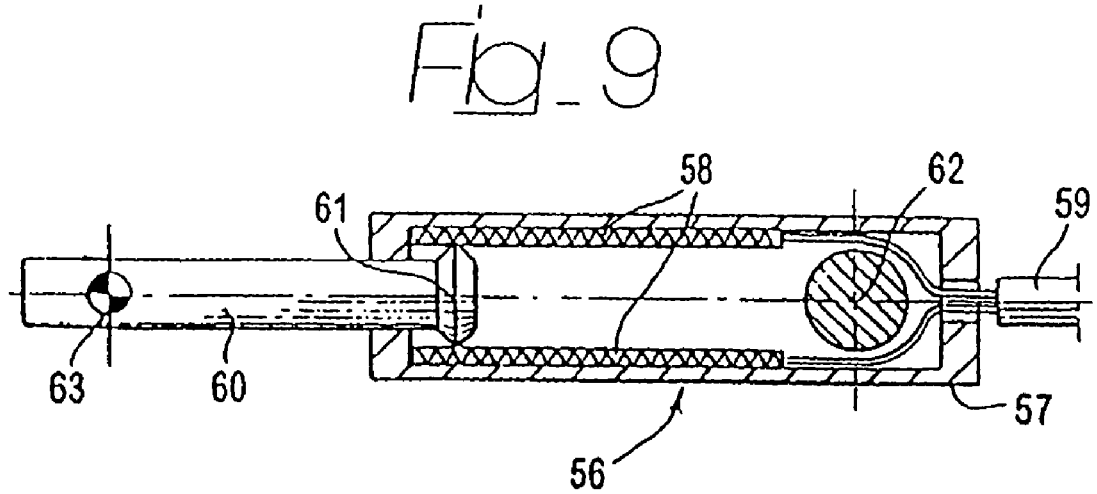

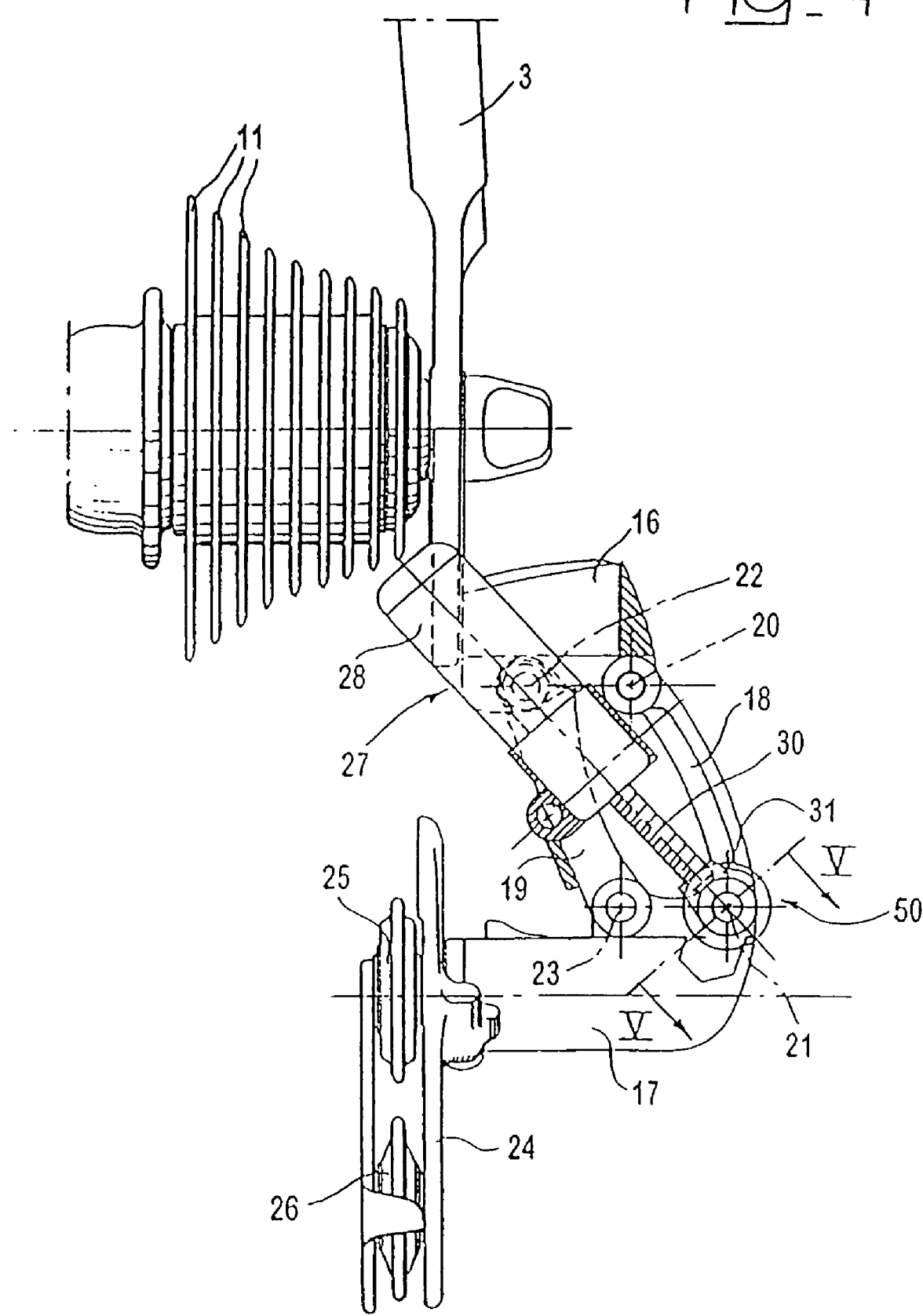
Fig_4

Fig_7
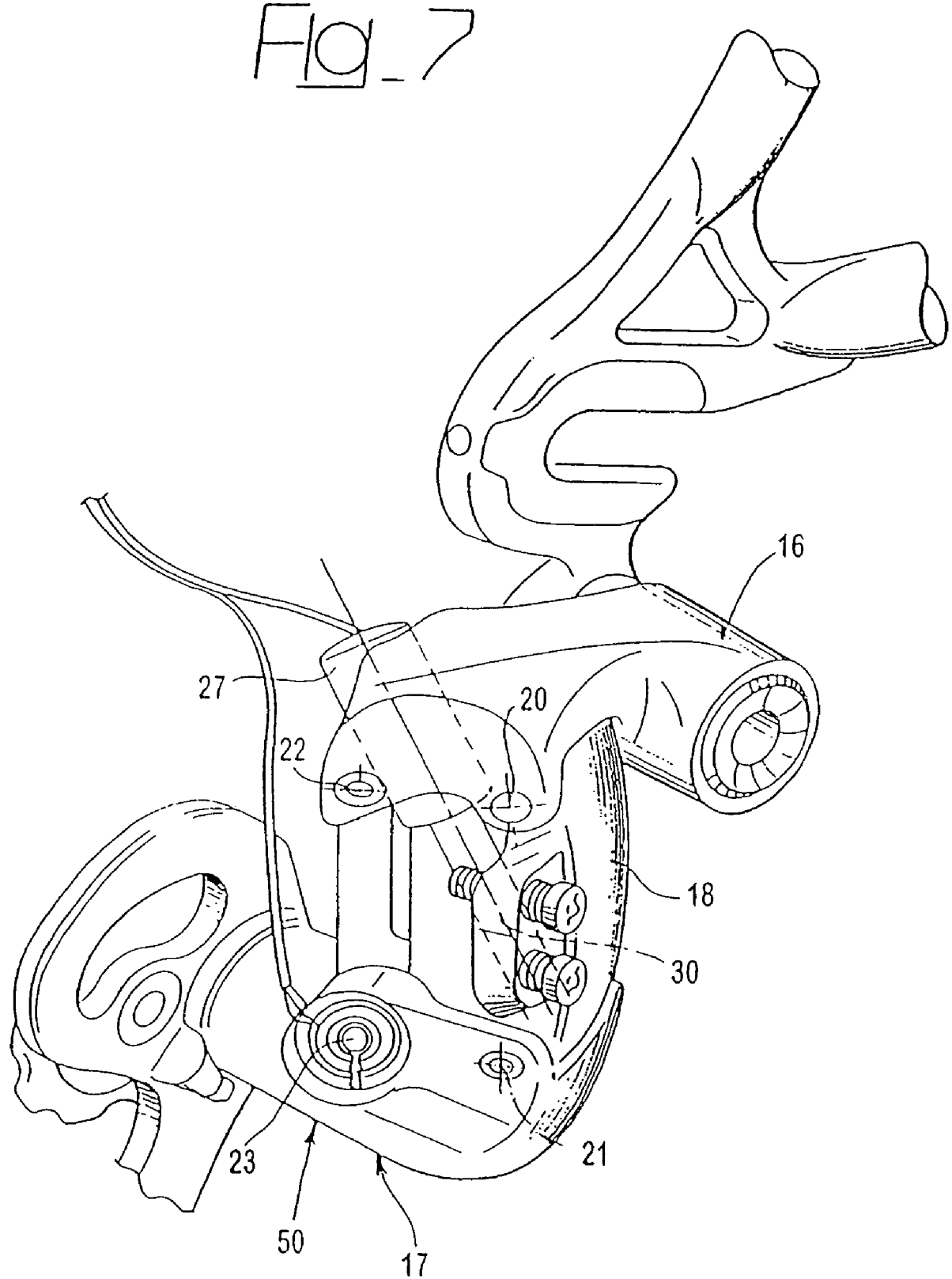

Fig_8
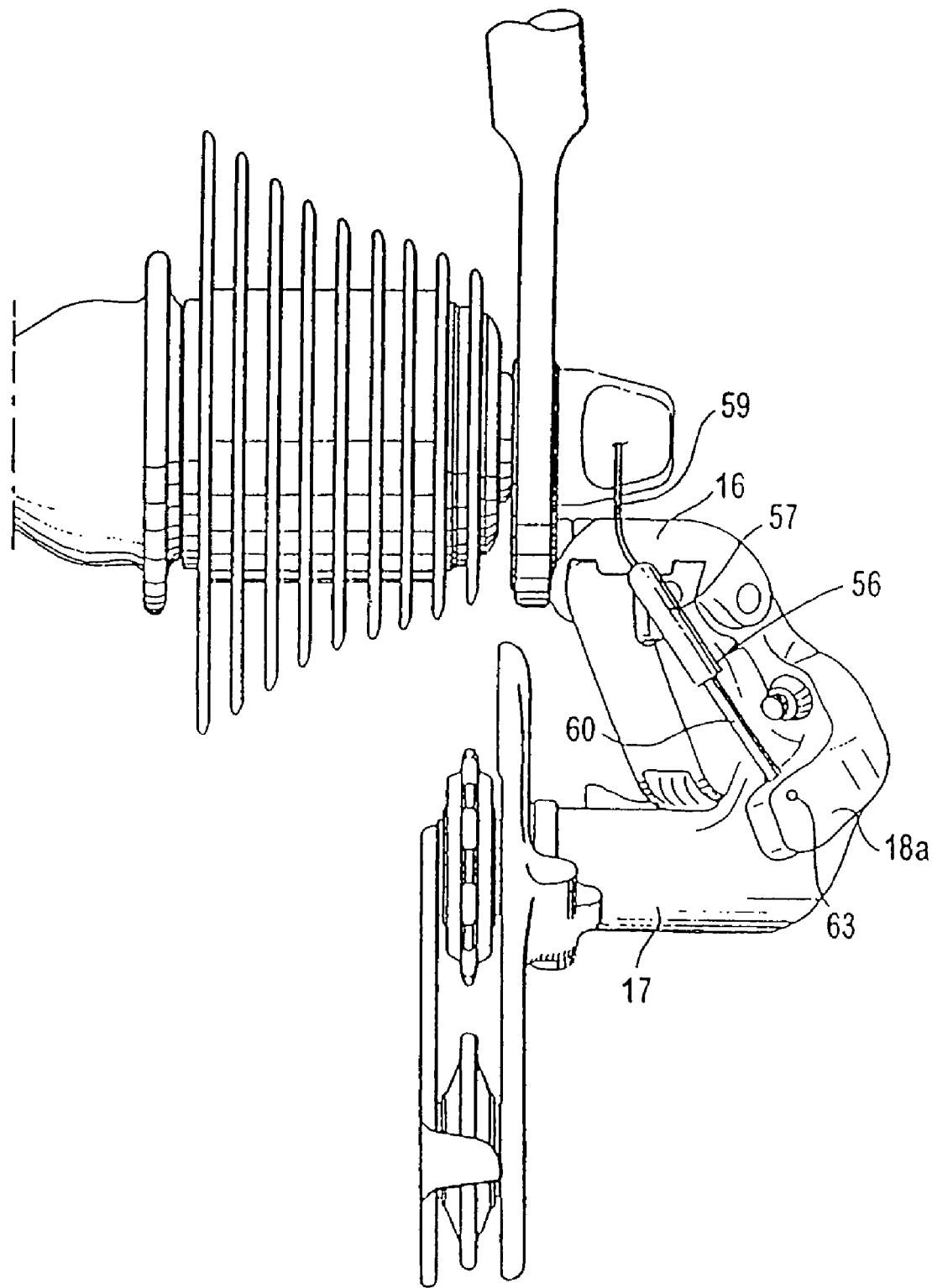

Fig_10
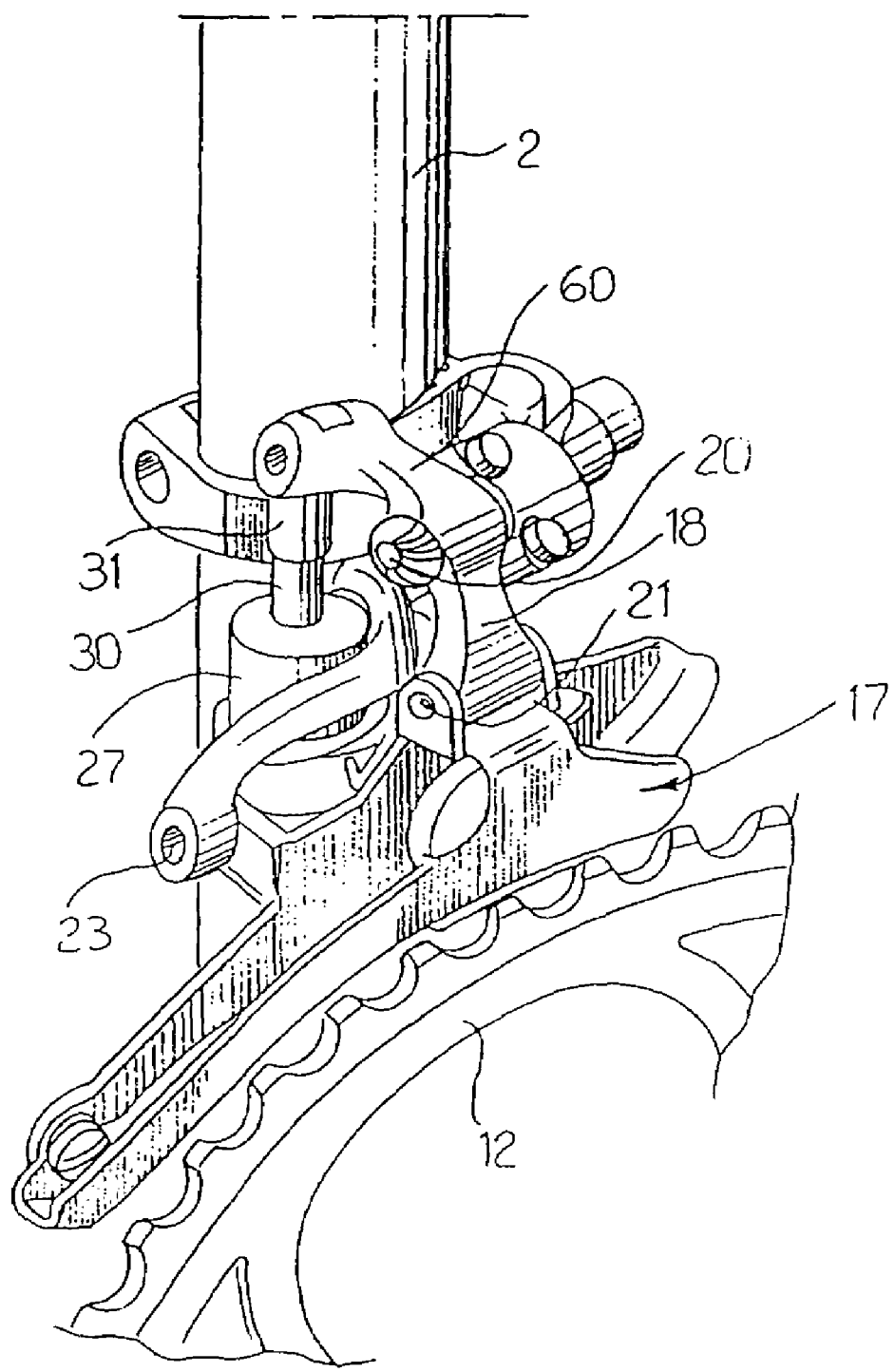

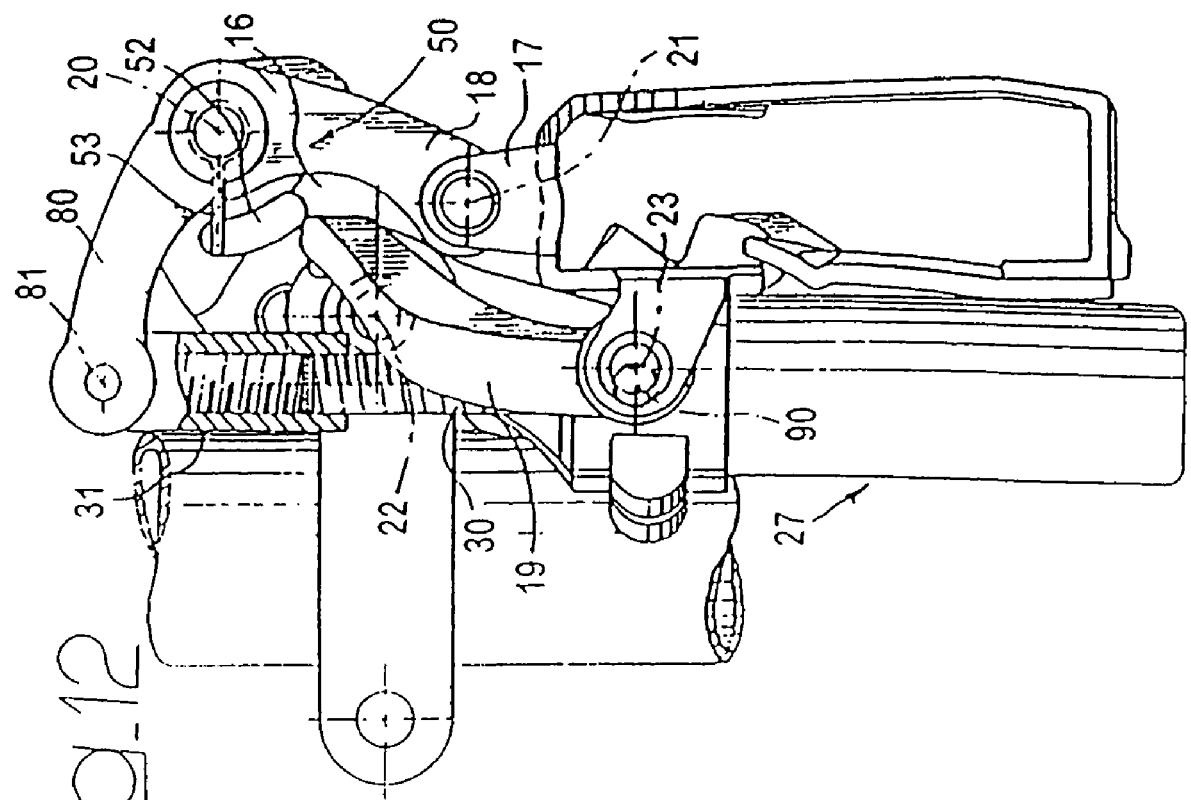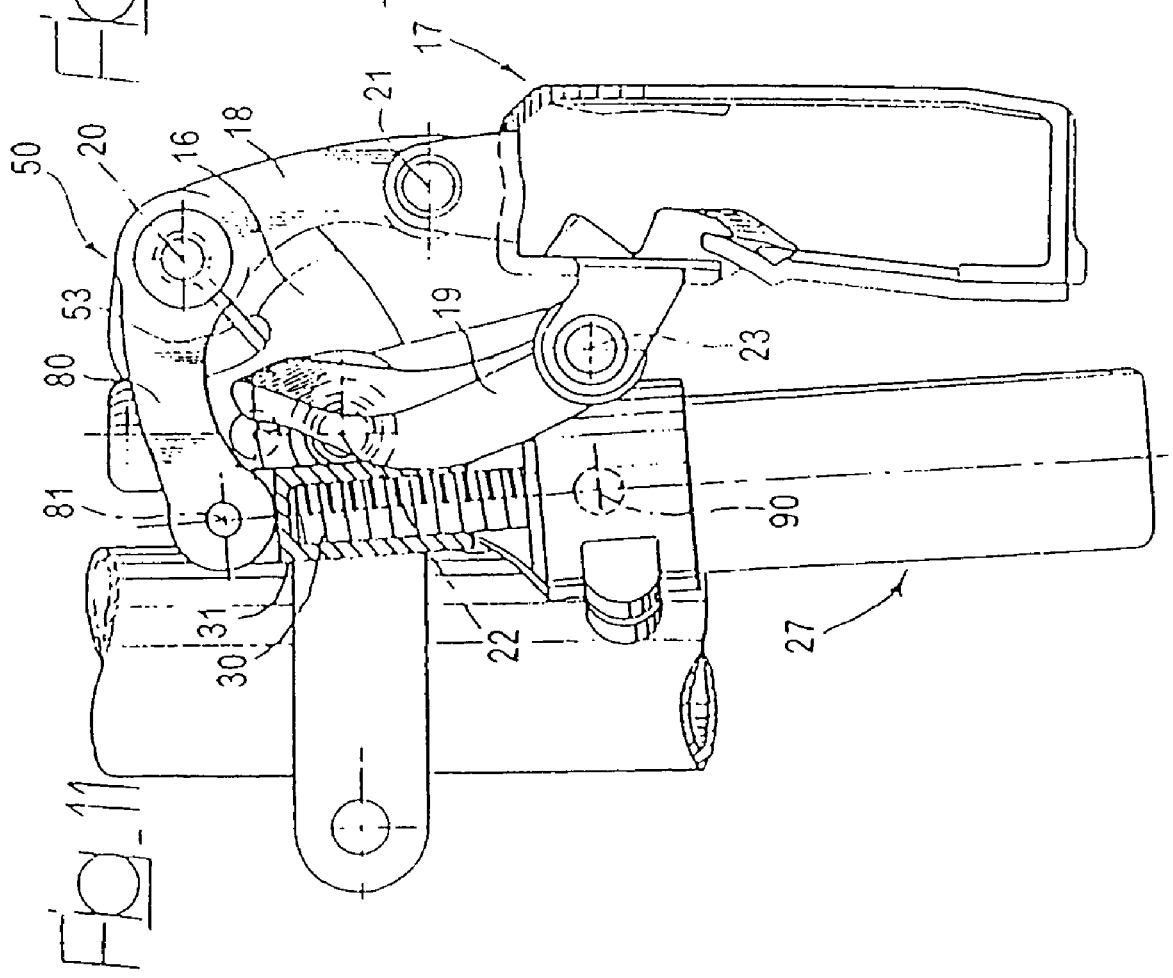

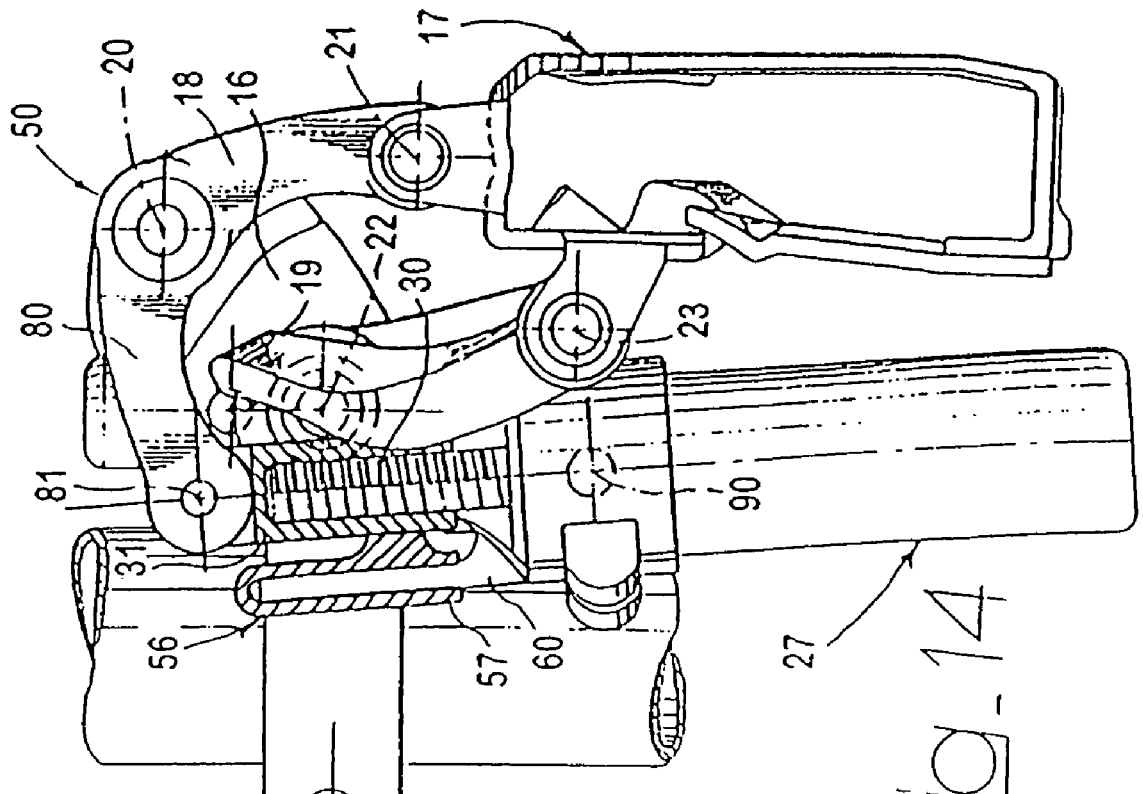
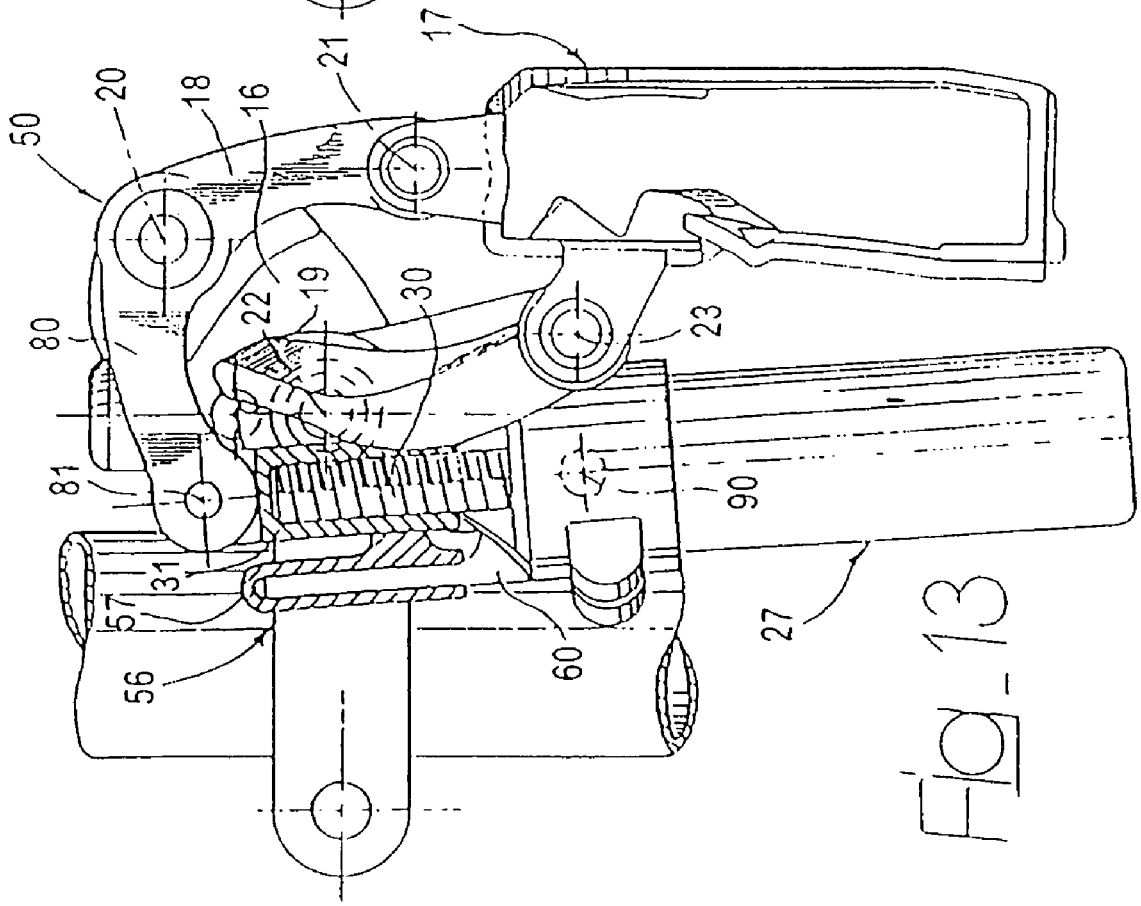

GEAR SHIFT DEVICE FOR BICYCLES

CROSS REFERENCE TO RELATED APPLICATIONS

This application is a continuation of U.S. Pat. Nos. 6,623,389 and 7,048,659, which in turn claim priority from Italian Patent Application No. TO99A001023, filed Nov. 23, 1999. U.S. Pat. Nos. 6,623,389 and 7,048,659 are incorporated herein by reference as if fully set forth.

BACKGROUND

The present invention refers to a gear shift device for bicycles having at least one derailleur, a first body destined to be attached to a bicycle frame and a second body that can be displaced with respect to the first body to cause the selective engagement of a bicycle chain on a number of sprockets, to achieve the various gears of the device, the device comprising:

an electric actuator to drive the displacement of the second body of the derailleur, electronic control means for controlling the electric actuator, manually-operated activating means, connected to the electronic control means, to cause activation of the electric actuator in order to select the required gear, means for detecting the position of the second body of the derailleur and for indicating the position to the control means, so as to permit the automatic disabling of the electric actuator once the required position has been reached, in which the electric actuator is directly associated with the derailleur.

A gear shift device of the kind outlined above is described and illustrated in U.S. Pat. No. 5,480,356, a patent held by the same applicant.

FIG. 1 of the attached drawings illustrates a racing bicycle, indicated as a whole by reference number 1, comprising a frame 2 constructed, in a well-known manner, of tubular elements comprising stays 3 for supporting the rear wheel 4. Reference number 5 indicates a fork for supporting a front wheel 6, associated with a handlebar 70, which is also made with a tubular structure.

In its lower part, the frame 2 carries a crankset 7 of substantially conventional type for driving the rear wheel 4 by means of a gear shift device made according to the present invention, indicated globally by the number 8.

The gear shift device 8 essentially includes a rear assembly 9 and a front assembly 10 comprised, in a well-known manner, of a number of sprockets 11 of various diameters, co-axial with the axle A of the rear wheel 4, and a number of crown wheels 12, also of various diameters, co-axial with the axle B of the bicycle's crankset 7.

The sprockets 11 and the crown wheels 12 can be engaged selectively by a chain transmission forming a closed ring 13 to achieve the different gear ratios available by means of the gear shift device 8, by activating a rear derailleur 14 forming part of the rear assembly 9 and a front derailleur 15 belonging to the front assembly 10.

FIG. 2 in the enclosed drawings illustrates the rear derailleur 14 made according to the solution proposed in U.S. Pat. No. 5,480,356. The rear derailleur 14 includes a first body 16 that is designed to be attached to the bicycle frame and a second body 17 connected to the first body 16 by means of a parallelogram linkage comprising two arms 18 and 19, the ends of which are articulated at 20, 21 and 22, 23 to the two bodies 16 and 17. The second body 17 includes, in a well-known manner, a rocker arm 24 that carries the chain transmission wheels 25 and 26.

Reference number 27 indicates an electric actuator, in the form of an electric motor combined with a reduction gear 29, that is directly incorporated in the derailleur 14 to drive the displacement of the second body 17, and consequently also of the rocker arm 24, through the various engagement positions of the chain 3 with the sprockets 11.

FIG. 3 in the enclosed drawings illustrates the motor and reduction gear assembly 27 forming the object of the device described in U.S. Pat. No. 5,480,356. In the Figure, the body of the motor and reduction gear assembly 27, indicated as 28, is shown on a larger scale and in cross-section. The body 28 contains not only the motor 35, but also an epicycloid reduction gear 29 connected to the shaft coming from the electric motor 35. The epicycloid reduction gear 29 drives the rotation of a screw 30. As shown in FIG. 2, the body 28 of the motor and reduction gear assembly is attached with an articulated coupling to the body 16 of the derailleur around an axis 22, while the screw 30 engages a nut screw 31, the body of which is mounted in an articulated manner around an axis 21 on the body 17 of the derailleur. As a result, the motor and gear reduction assembly lies along a diagonal of the parallelogram linkage and the turning of the motor causes a corresponding rotation of the screw 30 by the epicycloid gearing 29, so that the nut screw 31 moves along the screw, leading to an elongation or shortening of the distance between the axes 21 and 22 of the parallelogram linkage.

As illustrated in FIG. 3, the body 28 of the motor and reduction gear assembly also contains a device 32 comprising an encoder, including an optical or magnetic sensor that co-operates in a well-known manner with a disc 34 carried by the screw 30.

The electric power to the motor and reduction gear assembly 27 is provided by means of a battery 37 (FIG. 1) conveniently housed in one of the tubes of the bicycle frame 2 or, alternatively, in one side of the handlebar 70, or inside the container of a microprocessor control unit 40 (only partially visible in FIG. 1) that may be attached, for instance, to the bicycle frame in the area of the crankset and is used to control the electric motor 35 on the basis of signals originating from two manually-operated control levers 43 and 44 (which could also be replaced by two buttons) associated, in a well-known manner, with a brake lever 41 (FIG. 1). The microprocessor unit 40 is also connected to the encoder 32, which detects the angular position of the screw 30, and consequently of the rear derailleur, so as to stop the electric motor when a required transmission gear has been reached, the gear being selected by manually operating the levers 43 and 44 (which are operated to shift the chain into higher or lower gears, respectively). The connections between the aforementioned electric components are made, in the case of the above-mentioned well-known solution, by means of wires (not shown in the drawings) conveniently positioned inside the tubes of the bicycle frame 2.

The above-mentioned earlier document describes the opportunity to use an encoder of any kind to provide the means for detecting the position of the second body of the derailleur. In the course of experience gained in the past by the applicant, an incremental encoder was used. With this type of transducer, however, any interruption in the electric power supply to the encoder made it necessary to provide for a procedure for re-calibrating the encoder by making the derailleur move to the position taken as the zero reference by the encoder. It is also important to bear in mind that there is an increasingly-felt need to increase the autonomy of the bicycle with battery-powered systems and therefore to reduce the consumption of electrical energy. For this purpose, control systems can be used that enable energy to be delivered only for the amount of time it takes to satisfy the requirement, after which the system returns to a low-consumption regime. It is also true that, even using an incremental transducer, strategies can be adopted to keep the position value detected memorized at logic level in the control unit. However, this solution may not be sufficient to guarantee the reliability of the transducer, because while it is not being powered the position of the second body of the derailleur may undergo small variations due to the vibrations to which the bicycle is liable while in motion.

SUMMARY

The purpose of the present invention is to achieve a gear shift device of the type outlined at the beginning of this description, in which the means for detecting the position of the movable body of the gear gives a reliable and accurate indication of the position, even in the event of an interruption in the power supply, for instance.

With a view to achieving the purpose, the object of the invention is a gear shift device having all the characteristics illustrated at the beginning of this description and characterized, moreover, in that the detection means are comprised of an absolute electric transducer associated with the derailleur and designed to produce an electric signal indicating the absolute position of the second body of the derailleur.

Thanks to the characteristic, the transducer is always capable of providing accurate information on the position of the second body of the derailleur, without requiring any re-calibration procedures after an interruption in the power supply.

In a preferred embodiment, the transducer is a potentiometer comprising at least one electrically-conducting track and a contact sliding on the track due to the effect of any movement of the second body of the derailleur with respect to the first body. In a first example of the embodiment, the potentiometer is of the rotating type, comprising at least one circular track and one rotating movable contact engaged on the track. In a second example, the potentiometer is a sliding potentiometer comprising a cylinder carrying the aforementioned track and a rod carrying the movable contact that slides inside the cylinder.

The absolute transducer can be associated directly with the actuator, or it can be placed between two parts of the derailleur that move in relation to each other as a result of the movement of the second body with respect to the first body. For instance, in the case in which the derailleur has a parallelogram linkage that connects the first body to the second body, a rotating potentiometer can be used in association with any of the articulations of the parallelogram linkage, or a sliding potentiometer can be arranged between two parts of the parallelogram linkage that move in relation to each other, or between the body of the motor and a nut screw that engages a screw driven by the motor.

In the case of the potentiometer being mounted on the shaft of the actuator, it is preferable for it to be placed downstream from a reduction device so that the potentiometer performs less than one turn when the derailleur moves between its two end positions. Otherwise, a reduction gear can be provided in the potentiometer itself or, alternatively, means for counting the turns of the shaft on which the potentiometer is installed can be provided together with the potentiometer.

The absolute transducer may not necessarily be a potentiometer; for instance, it could be a resistive transducer or a transducer of optical or magnetic type, such as a Hall-effect transducer.

BRIEF DESCRIPTION OF THE DRAWINGS

Further characteristics and advantages of the invention will emerge from the description that follows with reference to the attached to drawings, which are provided purely by way of example and in no way restrict its scope, in which:

FIG. 2 is a perspective view of a rear derailleur made according to the well-known technique, FIG. 3 is a perspective exploded view of the motor and reduction gear assembly forming part of the derailleur in FIG. 2, FIG. 4 is a partial cross-section of a front view of a first embodiment of a rear derailleur made according to the present invention, FIG. 5 is a cross-section along the line V-V of FIG. 4, FIG. 6 is a cross-section along the line VI-VI of FIG. 5, FIG. 7 is a perspective view of a second embodiment of a rear derailleur made according to the present invention, FIG. 8 is a front view of a rear derailleur made according to a third embodiment of the present invention, FIG. 9 is a cross-section on an exploded scale of a detail of FIG. 8, FIG. 10 is a perspective view of a front derailleur of a bicycle made according to a first embodiment of the present invention, FIG. 11 is a partial cross-section of the front derailleur of FIG. 10, FIG. 12 is a view corresponding to the one in FIG. 11 that illustrates the front derailleur in a different operating condition, and FIGS. 13 and 14 illustrate a variant of the front derailleur illustrated in FIGS. 11 and 12.

DETAILED DESCRIPTION OF THE PREFERRED EMBODIMENTS

Figure 1:
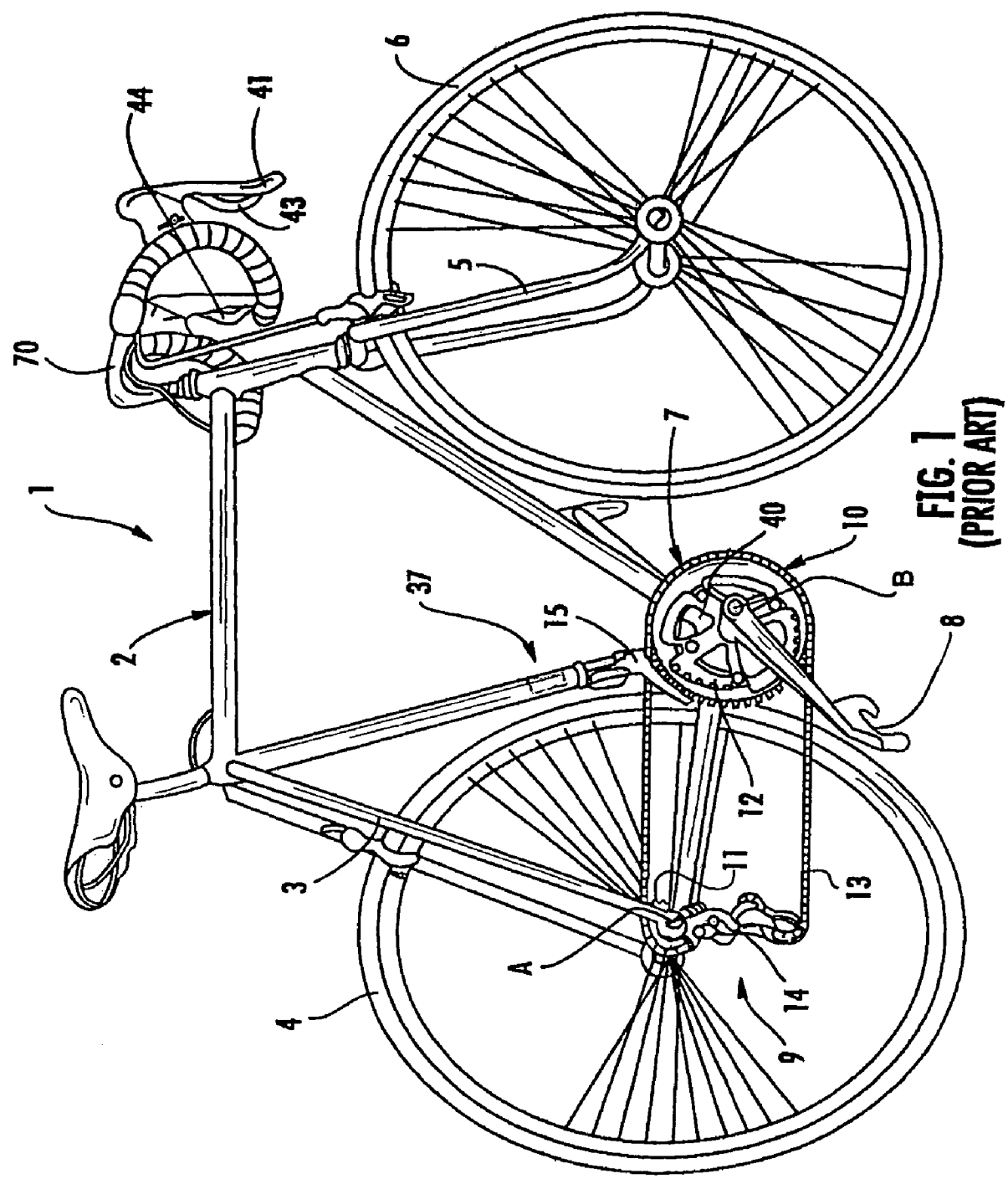
FIG. 1 is a perspective view of a racing bicycle.

In FIG. 4 the parts corresponding to the ones illustrated in FIG. 2 are indicated by the same reference number. The general arrangement of the rear derailleur illustrated in FIG. 4 is substantially the same as the one illustrated in FIG. 2. Here again, the motor and reduction gear assembly has a body 28 articulated at 22 to the first body 16 of the derailleur and controls a screw 30 that engages a nut screw 31 articulated at 21 to the second body 17 of the derailleur. In the case of FIG. 4, however, the means for detecting the position of the second body 17 are comprised not of an encoder associated with the motor and gear reduction assembly 27, but of a transducer 50 mounted in line with the articulation 21 of the parallelogram linkage. To be more specific, the transducer 50 is an absolute transducer, i.e. designed to produce an electric output signal indicating the absolute position of the second body 17. In the embodiment of FIG. 4, the transducer 50 is comprised of a rotating potentiometer capable of detecting the absolute angular position of the second body 17 with respect to a pin 51 (see FIGS. 5 and 6) which achieves the articulation of the body 17 on the arm 18 of the parallelogram articulated around the axis 21. The pin 51 rotates freely with respect to the body 17 and is rigidly connected to the arm 18 of the parallelogram linkage, so a certain relative rotation of the pin 51 around the body 17 unequivocally corresponds to a certain position of the body 17. As shown in FIGS. 5 and 6, the transducer 50 includes two circular electric tracks 52, both supported by the body 17 lying coaxially to the axis 21, and a rotating contact 53, that moves with the pin 51 and has two points of contact 54 (see FIG. 5) engaged in sliding contact respectively with the two tracks 52. The two tracks 52 are electrically connected by means of a cable 55 to the power supply and the movable contact 53 is used to close the circuit between the two tracks, and any variation in the position of the movable contact 53 gives rise to a variation in the electrical resistance which can be measured, in a well-known manner, in order to produce a signal indicating the absolute position of the movable body 17. The arrangement shown in FIG. 6 would be an example of an arrangement that would be possible for use as a magnetic (e.g. Hall-effect, presently preferred) or optical transducer 50 as well. In such arrangements, the rotation of the contact 53 and pin 51 is either magnetically or optically detected.

FIG. 7 illustrates a second embodiment that only differs from the one illustrated in FIG. 4 in the fact that the transducer 50 is arranged not in line with the articulation 21, but with another articulation of the parallelogram linkage instead (i.e. articulation 23). Otherwise, the structure of the derailleur and of the transducer 50 is identical to the one described with reference to FIGS. 4-6.

FIG. 8 illustrates a further embodiment in which an absolute transducer 56 is used, comprised of a sliding cylinder-type potentiometer. The construction of the potentiometer is schematically illustrated in FIG. 9. The potentiometer includes a cylinder 57 that contains two electric tracks 58 extending face-to-face, powered by means of a cable 59. Inside the cylinder 57 there is a sliding rod 60 with an element 61 inside the cylinder, rather like a piston, which acts as a movable contact designed to close the circuit by connecting the two tracks 58 together, so that, here again, the electrical resistance of the assembly depends on the position of the rod 60.

As illustrated in FIG. 8, the transducer 56, like the motor and gear reduction assembly 27, also lies substantially along a diagonal of the parallelogram linkage (on an outer side of the parallelogram, where the transducer 56 does not interfere with the motor). The cylinder 57 is articulated at 62 to the fixed body 16, while the rod 60 is articulated at 63 to an appendix 18a on the arm 18 of the parallelogram linkage (similar to one generally used in conventional derailleurs for coupling the flexible control cable).

FIGS. 10-12 illustrate a further example of implementation of the invention applied to the case of a front derailleur. Here again, the front derailleur is comprised, in a well-known manner, of a first body 16, designed to be attached in some known manner to the bicycle frame, and a second body 17 shaped according to the conventional method in the form of a fork, to control the selective engagement of the chain on the crown wheels 12 associated with the crankset. The body 17 is also connected to the fixed body 16, again in a well-known manner, by means of a parallelogram linkage comprising two arms 18 and 19, articulated at 20, 21 and 22, 23 respectively to the fixed body 16 and the movable body 17. Moreover, the arm 18 extends, in the case of the present invention, into a lever 80, whose movement is controlled by a motor and reduction gear assembly 27 of the kind described previously, mounted on the fixed body 16 so as to oscillate around an axis 90 parallel to the axes 20-23 of the parallelogram linkage. The motor and reduction gear assembly 27 causes the rotation of a screw 30 that engages a nut screw 31 articulated at 81 to the lever 80. FIGS. 11 and 12 illustrate the fork-shaped movable body 17 in its two end positions.

As in the case of the rear derailleur, the position of the movable body 17 is detected, here again, by means of an absolute transducer 50. In the example of FIGS. 11 and 12, the transducer 50 is a rotating potentiometer, associated with the articulation 20, and comprising a rotating contact 53 connected to the arm 18 and to the lever 80, sliding over an arched track 52 on the fixed body 16.

Finally, FIGS. 13 and 14 illustrate a variant that is substantially identical to the one illustrated in FIGS. 11 and 12, except for the fact that in this case a transducer 56 comprised of a sliding potentiometer is used, comprising a rod 60 engaged in sliding contact inside a guide element 57. The construction of the inside of the transducer 56 can be much the same as the one illustrated with reference to FIG. 9, in the sense that the rod 60 can carry a movable contact designed to connect two opposite tracks placed on the inside surface of the guide element 57.

It appears evident from the previous description that the principle lying at the basis of the present invention is that of achieving a motorized gear shift device using a motor directly associated with the derailleur and a transducer for detecting the position of the movable body controlled by the motor, which is a transducer of absolute type, i.e. designed to produce an output signal indicative of the absolute position of the movable body. Although the achievement of the transducer in the form of a potentiometer is preferred, any other type of absolute transducer could also be used.

For instance, optical or even magnetic (e.g. Hall-effect) types of absolute transducers 50,56 suitable for producing an output signal indicative of the absolute position of the element detected are also well-known. These alternative transducer types may be configured in the same manner that the transducers 50,56 are configured. Further, resistive transducers 50,56 can be used. In a resistive transducer, the resistance changes in response to the value of the physical quantity being measured. A potentiometer is one kind of resistive transducer.

It is equally evident from the preceding description that, thanks to the use of an absolute transducer, the device made according to this invention is always capable of providing a reliable and accurate indication of the position of the element being displaced, regardless of any interruptions in the power supply, or any bumping or vibrations that the device may suffer when the bicycle is in motion.

It is also clear that the positioning of the absolute transducer can vary considerably with respect to the one described and illustrated here by way of example. As we have seen in the case of a derailleur with a parallelogram linkage, the transducer can be placed in line with any of the articulations of the parallelogram linkage, or it can be placed between any two parts of the derailleur that move in relation to each other as a result of any displacement of the movable body of the derailleur. Alternatively, the transducer can be associated directly with the controlling motor and reduction gear assembly. Obviously, the signal from the transducer is more accurate when the latter is mounted as close as possible to the element it monitors, so that its signal is not influenced by any drive elements or by the corresponding slack.

Finally, as concerns the electric control motor, this can obviously be made in any well-known manner. For instance, the motor can be a dc motor with brushing contacts, an ultrasonic motor, a stepping motor, or a brushless motor.

The electric connections between the component parts of the device made according to this invention can also be achieved with a wireless type of technology, using transmitter and receiver devices associated with the various components.

Of course, without prejudice to the principle of the invention, the construction details and types of implementation can vary considerably with respect to the version described and illustrated here merely by way of example, without departing from the context of the present invention.

What is claimed is:

1. A gear shift device for bicycles having at least one derailleur, a first body adapted to be attached to a bicycle frame, and a second body that can be displaced with respect to the first body to cause the selective engagement of a bicycle chain on a number of sprockets, to achieve the various gear ratios of the device, the device comprising:
   an electric actuator for displacing the second body relative to the first body; and
   an absolute transducer that operates independently from the actuator and is mounted on the device for detecting an absolute position of the second body.

2. The device according to claim 1 wherein the transducer is a resistive transducer.

3. The device according to claim 1 wherein the transducer is a rotary potentiometer.

4. The device according to claim 1 wherein the transducer is a linear potentiometer.

5. The device according to claim 1 wherein the transducer is a magnetic transducer.

6. The device according to claim 1 wherein the transducer is a rotary magnetic transducer.

7. The device according to claim 1 wherein the transducer is a linear magnetic transducer.

8. The device according to claim 1 wherein the transducer is an optical transducer.

9. The device according to claim 1 wherein the transducer is a linear optical transducer.

10. The device according to claim 1 wherein the transducer is a rotary optical transducer.

11. The device according to claim 1 wherein the transducer is a Hall-effect transducer.

12. The device of claim 1, wherein the absolute transducer is separated from the electric actuator by a screw that is driven by the actuator.

13. The device of claim 12, wherein when the actuator drives the screw, a distance between the absolute transducer and the actuator changes.

14. A gear shift device for a bicycle having a transmission chain, a first body for attachment to a bicycle frame, and a second body, pivotably associated to the first body, which selectively engages the transmission chain, the device comprising:
   an electric actuator mounted on the device that displaces the second body relative to the first body; and
   an absolute transducer separate and independent from the actuator and mounted on the device that detects an absolute position of the second body.

15. The device according to claim 14 wherein the transducer is a potentiometer.

16. The device according to claim 14 wherein the transducer is a magnetic transducer.

17. The device according to claim 16 wherein the magnetic transducer is a linear magnetic transducer.

18. The device according to claim 14 wherein the transducer is an optical transducer.

19. The device of claim 18 wherein the optical transducer is a rotary optical transducer.

20. The device of claim 14 wherein the transducer is a Hall-effect transducer.

21. A method for positioning and determining the position of a transmission chain on a bicycle having a frame and a plurality of sprockets which are selectively engaged by the transmission chain, the method comprising:
   attaching a first body on the bicycle frame in proximity to the plurality of sprockets;
   pivotably associating a second body to the first body for selectively positioning the transmission chain on one of the plurality of sprockets;
   attaching an electric actuator to the device which positions the second body relative to the first body for positioning the transmission chain;
   attaching an absolute transducer that operates independently from the electric actuator to the device for detecting an absolute position of the second body.

22. The method of claim 21 wherein the transducer comprises a potentiometer.

23. The method of claim 21 wherein the transducer comprises an optical transducer.

24. The method of claim 21 wherein the transducer comprises a magnetic transducer.

25. The method of claim 21 wherein the transducer is a Hall-effect transducer.

26. A gear shift device for bicycles having at least one derailleur, a first body attachable to a bicycle frame, and a second body that can be displaced with respect to the first body, which in turn causes engagement of a bicycle chain from one toothed crown to a toothed crown, the device comprising:
   an electric actuator that displaces the second body relative to the first body when it receives a gear shifting request, said displacement moving the chain from the one toothed crown to the second toothed crown; and
   a transducer separate and independent from the electric actuator that detects at least two positions of the second body relative to a position of the first body, wherein when one of said positions corresponds to a position where the chain is engaged with the second toothed crown, the transducer outputs a signal that selectively disables the electric actuator.

27. The device of claim 26 wherein the transducer is an absolute transducer that detects the positions of the second body relative to the first body.

28. A gear shift device for bicycles having at least one derailleur, a first body attachable to a bicycle frame, and a second body that can be displaced with respect to the first body, which in turn causes engagement of a bicycle chain from one toothed crown to a toothed crown, the device comprising:
   an electric actuator that displaces the second body relative to the first body when it receives a gear shifting request, said displacement moving the chain from the one toothed crown to the second toothed crown; and
   a transducer that operates independently from the electric actuator and detects multiple positions of one of the first or second bodies relative to the other of the first or second bodies, wherein when one of said positions corresponds to a position where the chain is engaged with the second toothed crown, the transducer outputs a signal that selectively disables the electric actuator.

29. The device of claim 28 wherein the transducer is an absolute transducer.

30. A gear shift device for bicycles having at least one derailleur, a first body attachable to a bicycle frame, and a second body that can be displaced with respect to the first body, which in turn causes engagement of a bicycle chain from one toothed crown to a toothed crown, the device comprising:

an electric actuator that displaces the second body relative to the first body when it receives a gear shifting request, said displacement moving the chain from the one toothed crown to the second toothed crown; and an absolute transducer that operates independently from the electric actuator and detects at least two positions of the second body relative to a position of the first body.

31. A gear shift device for bicycles having at least one derailleur, a first body adapted to be attached to a bicycle frame, and a second body that can be displaced with respect to the first body to cause the selective engagement of a bicycle chain on a number of sprockets, to achieve the various gears of the device, the device comprising:

an electric actuator for displacing the second body relative to the first body; and a transducer that operates independently and is separate from the electric actuator and is mounted on the device for detecting a position of the second body relative to a position of the first body, the transducer outputting a signal that selectively disables the electric actuator.

32. A gear shift device for a bicycle having a transmission chain, a first body for attachment to a bicycle frame, and a second body, pivotably associated to the first body, which selectively engages the transmission chain, the device comprising:

an electric actuator mounted on the device that displaces the second body relative to the first body; and a transducer that operates independently from the electric actuator and is mounted on the device that detects a relative position of the second body with respect to the first body, wherein the transducer outputs a signal that selectively disables the electric actuator.

33. The device of claim 32, wherein the absolute transducer is separated from the electric actuator by a screw that is driven by the actuator.

34. The device of claim 33, wherein when the actuator drives the screw, a distance between the absolute transducer and the actuator changes.

35. A method for positioning and determining the position of a transmission chain on a bicycle having a frame and a plurality of sprockets which are selectively engaged by the transmission chain, the method comprising:

attaching a first body on the bicycle frame in proximity to the plurality of sprockets;

pivotably associating a second body to the first body for selectively positioning the transmission chain on one of the plurality of sprockets;

attaching an electric actuator to the device which positions the second body relative to the first body for positioning the transmission chain;

attaching a transducer that operates independently from the electric actuator to the device for detecting a position of the second body relative to a position of the first body, wherein the transducer outputs a signal that selectively disables the electric actuator.

36. A gear shift device for bicycles having at least one derailleur, a first body adapted to be attached to a bicycle frame, and a second body that can be displaced with respect to the first body to cause the selective engagement of a bicycle chain on a number of sprockets, to achieve the various gears of the device, the device comprising:

an electric actuator for displacing the second body relative to the first body; and an absolute transducer that operates independently from the electric actuator and is mounted on the device for detecting an absolute position of the second body, the transducer comprising two electric tracks and a contact with at least one point engaged in sliding contact respectively with the two tracks, wherein variation in the position of the contact gives rise to a variation in electrical resistance and produces a corresponding signal indicating the absolute position of the second body.

37. A gear shift device for bicycles having at least one derailleur, a first body adapted to be attached to a bicycle frame, and a second body that can be displaced with respect to the first body to cause the selective engagement of a bicycle chain on a number of sprockets, to achieve the various gear ratios of the device, the device comprising:

an electric actuator for displacing the second body relative to the first body; and an absolute transducer separate and independent from the actuator, said transducer mounted on the device for detecting an absolute position of the second body.

* * * * *